United States Patent [19]
Chrintz-Gath et al.

[11] Patent Number: 5,645,037
[45] Date of Patent: Jul. 8, 1997

[54] IGNITION SYSTEM FOR AN INTERNAL COMBUSTION ENGINE, PARTICULARLY FOR USE IN A CHAIN SAW OR THE LIKE

[75] Inventors: Per-Anders Chrintz-Gath, Västervik; Per Johan Udden, Ankarsrum, both of Sweden

[73] Assignee: FHP Elmotor Aktiebolag, Ankarsrum, Sweden

[21] Appl. No.: 495,525

[22] PCT Filed: Nov. 30, 1994

[86] PCT No.: PCT/SE94/01152

§ 371 Date: Jul. 28, 1995

§ 102(e) Date: Jul. 28, 1995

[87] PCT Pub. No.: WO95/15437

PCT Pub. Date: Jun. 8, 1995

[30] Foreign Application Priority Data

Dec. 1, 1993 [SE] Sweden .................................. 9303998

[51] Int. Cl.⁶ ...................................................... F02P 3/06
[52] U.S. Cl. ............................................................ 123/601
[58] Field of Search .................................. 123/601, 651, 123/603; 310/74

[56] References Cited

U.S. PATENT DOCUMENTS

| | | | |
|---|---|---|---|
| 4,515,140 | 5/1985 | Enomoto et al. | 123/603 |
| 4,611,570 | 9/1986 | Nash | 123/601 |
| 4,636,671 | 1/1987 | Terada | 310/74 |
| 4,641,627 | 2/1987 | Nash | 123/651 |
| 4,727,851 | 3/1988 | Orova | 123/601 |

*Primary Examiner*—Raymond A. Nelli
*Attorney, Agent, or Firm*—Pearne, Gordon, McCoy & Granger

[57] ABSTRACT

An ignition system for an internal combustion engine having a magnetically conducting core with at least three legs and supporting a charging winding and a triggering winding. A flywheel, having at least one magnetic field generating member, cooperates with a magnetically conducting core to cause, when passing, voltages to be induced in the windings. An electronic switch is adapted to trigger, in response to a trigger pulse generated by the triggering winding, the discharge of a first capacitor which has been charged by voltage generated in the charging winding, via the primary of an ignition coil, a secondary of which comprises a spark plug. The triggering winding is wound about two of the legs on the magnetically conducting core whereas a third leg supports the charging winding.

9 Claims, 6 Drawing Sheets

IGNITION SYSTEM FOR AN INTERNAL COMBUSTION ENGINE, PARTICULARLY FOR USE IN A CHAIN SAW OR THE LIKE

BACKGROUND OF THE INVENTION

The present invention relates to an ignition system for an internal-combustion engine, in particular for use in a chain saw or the like, comprising a magnetically conducting core having at least three legs and supporting a charging winding and a triggering winding, a flywheel having at least one magnetic field generating member adapted to cooperate with the magnetically conducting core to cause, when passing, voltages to be induced in the windings, and an electronic switch means adapted to trigger, in response to a trigger pulse generated by the triggering winding, the discharge of a first capacitor, which has been charged by a voltage generated in the charging winding, via the primary of an ignition coil the secondary of which comprises a spark plug.

Internal combustion engines for chain saws and the like often operate at very high speeds, for example up to 14,000 rpm. This means that the ignition system of the engine has to be designed so as to have a large ignition advance in order for the engine to operate properly. At the same time, the ignition advance must not be too large when the engine operates at idling speed or is to be started-up. If the ignition advance is too large at start it can easily happen that reverse motion takes place which may cause injury to the person handling, for instance, a chain saw. At start the person holds the chain saw in a certain grip and pulls a starting strap in order to rotate the engine and have it start. If during the compression phase of the piston an ignition spark should appear early, that is far before the top dead center, the piston may turn causing the engine to change its direction of rotation and pulling the strap back into the machine. This course is very abrupt so that the starting handle can be pulled out of hand of the person handling the saw with inconvenience or injury as a consequence.

In DE-A-38 33 620 an arrangement is described in which the problem is solved which relates to a too large ignition advance and the associated risk of backstroke to take place. A magnetically conducting core in the ignition system is provided with three legs of which, seen in the direction of rotation of the flywheel, a first leg has a first triggering winding while the center leg has a second triggering winding. The third leg, finally, supports the charging winding which generates energy for a capacitor which, by discharge, generates an ignition spark at the secondary of an ignition coil. At start, only the triggering winding provided on the center leg is active causing the ignition advance value to be moderate so that backstroke is avoided. In operation, a contact is closed connecting the triggering winding on the first leg causing the ignition advance, in a single step, to be increased to a suitable operational value. Even if in this way the problem has been solved which relates to the risk of a backstroke taking place, the possibility of additionally increasing the ignition adsvance under operating conditions is limited with the arrangement referred to. In practice, with the arrangement described it is not possible to reach an ignition advance value beyond about 10 degrees whereas about 25 degrees should be required at the high speeds concerned.

SUMMARY OF THE INVENTION

Accordingly, it is an object of the invention to offer a sufficiently low ignition advance at start and at the same time offer an ignition advance at operation speeds which exceeds 20 degrees and preferably amounts to about 25 degrees. An ignition system according to the present invention has a magnetically conducting core with at least three legs supporting a charging winding and a triggering winding. A flywheel having at least one magnetic field generated member is adapted to cooperate with the magnetically conducting core to cause, when passing, voltages to be induced in the windings. An electronic switch means is adapted to trigger, in response to a trigger pulse generated by the triggering winding, discharge of a first capacitor, which has been charged by voltage generated in the charging winding, via the primary of an ignition coil. The secondary of the ignition coil includes a spark plug. A triggering winding is wound about two of the legs on the magnetically conducting core, whereas the third leg supports the charging winding.

In further accordance with the present invention, the triggering winding is wound about the first two legs, as seen in the direction of rotation of the flywheel, of the magnetically conducting core. The electronic switch means is a thyristor, the trigger circuit of which comprises a transistor which is connected to the first capacitor in such a way that after discharge has taken place, the transistor prevents trigger pulses from acting on the thyristor until a new charging period has been initiated and a charging voltage on the first capacitor has reached a predetermined level.

BRIEF DESCRIPTION OF THE DRAWINGS

Other objects and advantages of the invention will become apparent from the following description of preferred embodiments with reference to the accompanying drawings, in which:

FIG. 13 shows a curve chart for voltages appearing in the ignition system; and

FIG. 14 shows a diagram in which both the curves for the triggering voltage $U_T$ and for the voltage $U_K$, generated in a power supply coil for the supply of associated electronic equipment, have been drawn in.

DETAILED DESCRIPTION OF THE PREFERRED EMBODIMENTS

Figure 1:
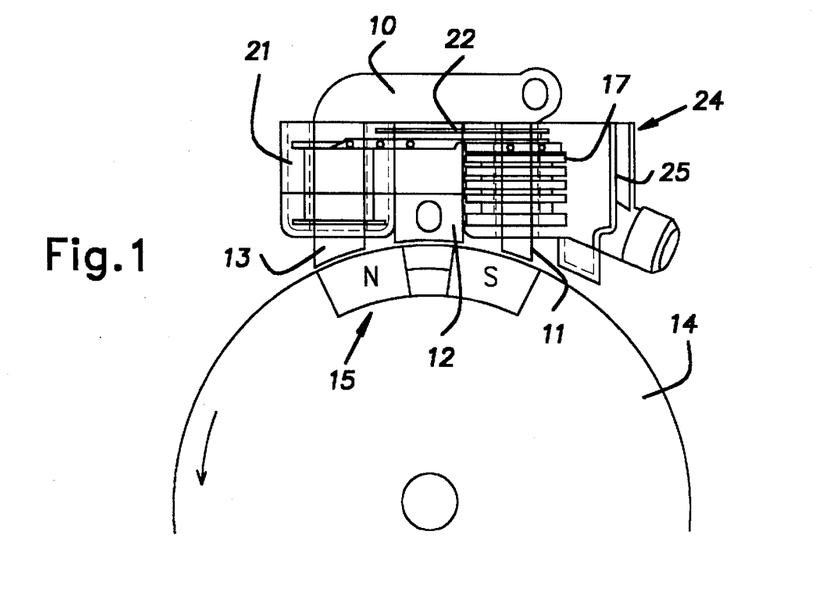
FIG. 1 is a schematic view of the ignition system according to the invention as seen in a direction perpendicular to a flywheel rotating in the plane of the drawing.

In FIG. 1 there is shown the mechanical structure of a magnetic type ignition system according to the invention.

The ignition system is adapted to be used in a two-stroke internal combustion engine for a chain saw. The engine is of a type commonly used and will not be described in further detail. The ignition system comprises a magnetically conducting iron core 10 provided with three legs 11, 12, 13. In a suitable way, the core is mounted on the chain saw to cooperate with a magnetic field generating device 15 fixed to the flywheel 14 on the engine and having the shape of a permanent magnet provided with poles marked by N and S, respectively.

Figure 2:
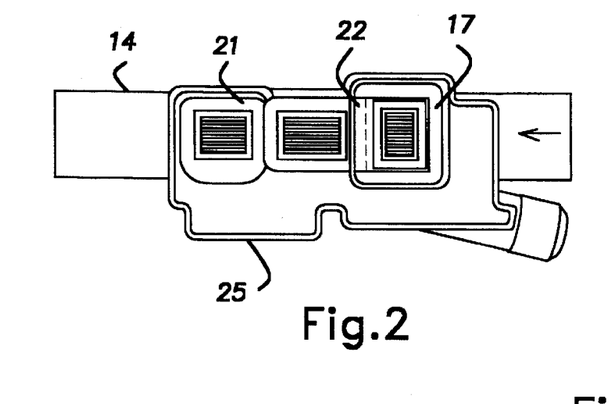
FIG. 2 shows a section of the ignition system of FIG. 1, seen from above.
Figure 3:
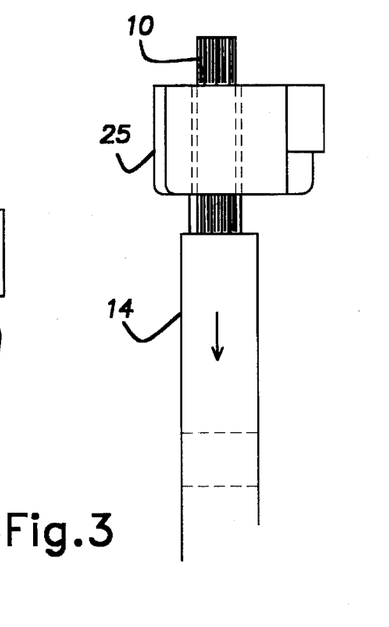
FIG. 3 shows the ignition system of FIG. 1, seen from the left side.
Figure 11:
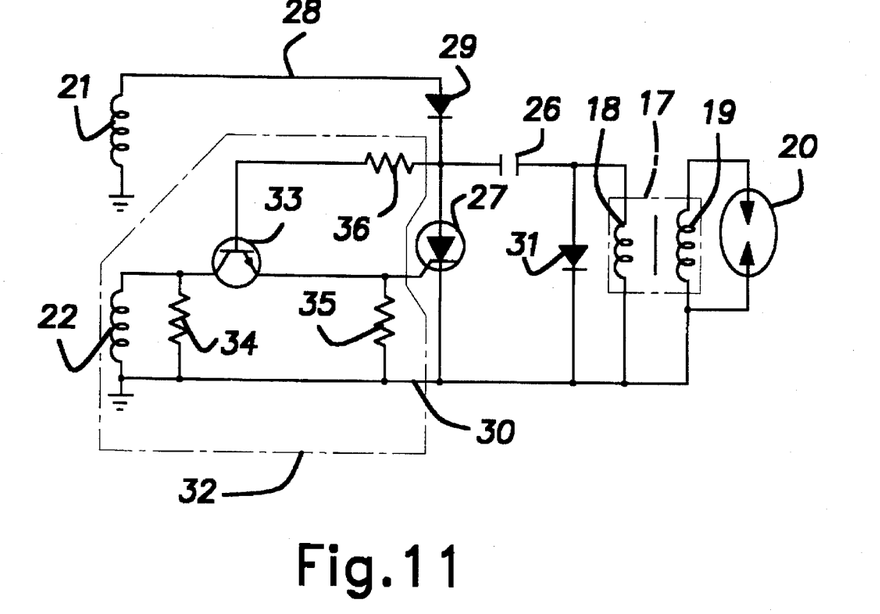
FIG. 11 shows an electric circuit diagram for the ignition system in a first embodiment of the invention.

The flywheel 14 rotates in the direction indicated by an arrow in the drawing. On the leg 11 the iron core 10 supports an ignition coil 17 comprising, in the usual way, a primary 18 and a secondary 19 (FIG. 11). A spark plug 20, schematically indicated in FIG. 11, is connected to the secondary. In addition, on the leg 13 of the iron core 10 a charging winding 21 is supported, the induced voltage of which being used to charge a capacitor 26 (FIG. 11) for the storage of ignition energy. Further, a triggering winding 22 is wound about the legs 11 and 12 and this winding is provided for triggering of an electronic switch. The disposition of the different windings clearly appears in FIGS. 1–3. The ignition coil 17, the triggering winding 22 and the charging winding 21 are supported on bobbins disposed in a plastic cup 25 provided with suitable holes for the legs of the iron core. In addition, the plastic cup 25 is intended to contain a printed circuit board supporting the electronic components of the ignition system. After the components have been mounted the plastic cup is filled with resin or the like for protection against moisture and other external influence.

Figure 4:
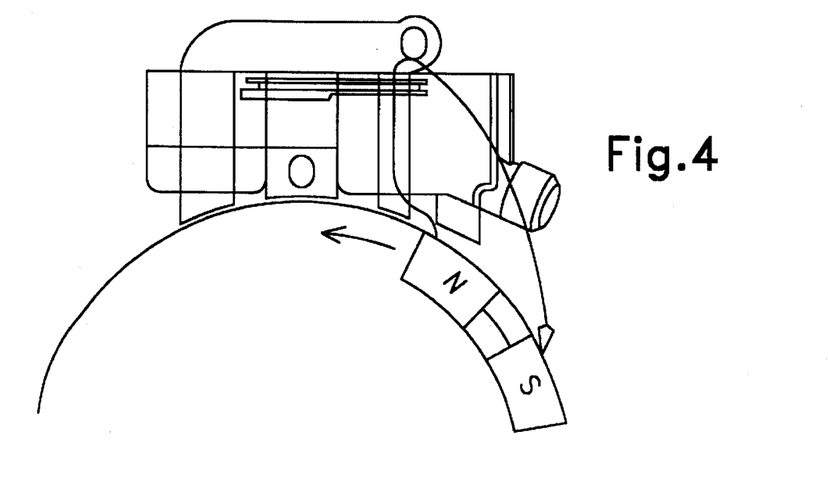
FIGS. 4–6 show the ignition system according to FIG. 1 with the flywheel in different positions.
Figure 5:
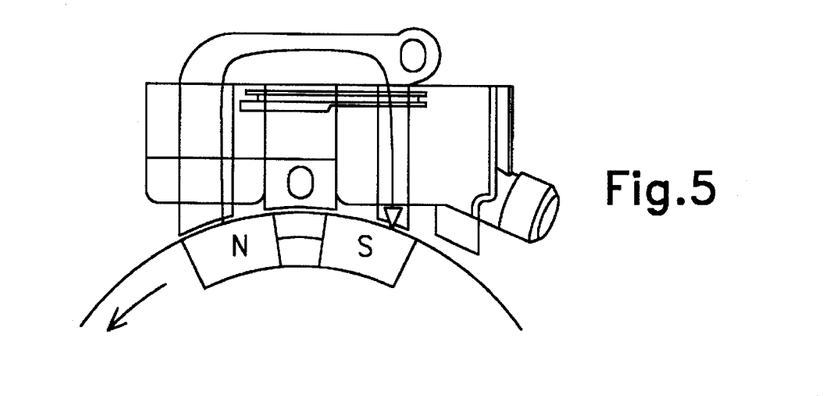
Figure 6:
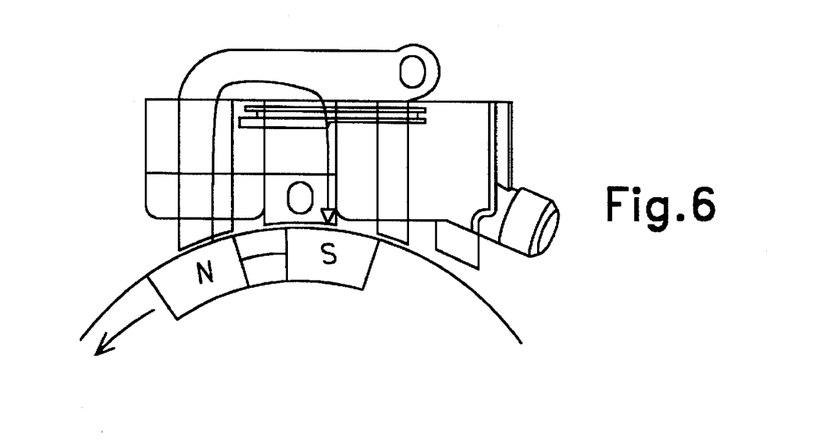

A brief description will now be given of the basic problem intended to be solved by the invention. In FIGS. 4–6 an ignition system according to the invention is shown with the flywheel in different positions and with the triggering winding 22 being wound about the legs 11 and 12. As shown by flow arrows in FIGS. 4–6 flux will pass through the triggering winding in all positions of the flywheel indicated in these drawing figures. In FIGS. 4 and 5 radii have been drawn in which have been designated 0°, 10° and 20° and which enclose corresponding arcs as counted from the radius 0°. Moreover, in FIGS. 4–6 diagrams have been drawn which show the triggering voltage $U_T$ as a function of the angular position in the area between the radii 0° and 20°. As appears from the diagrams in FIGS. 4–6 the triggering voltage is positive already at the radius 0° and continues to be positive till the radius 20° has been passed, see the diagram shown in FIG. 6. Thus, a very wide range of ignition advance is achieved for the engine permitting a good function both at low and at high engine speeds.

Figure 7:
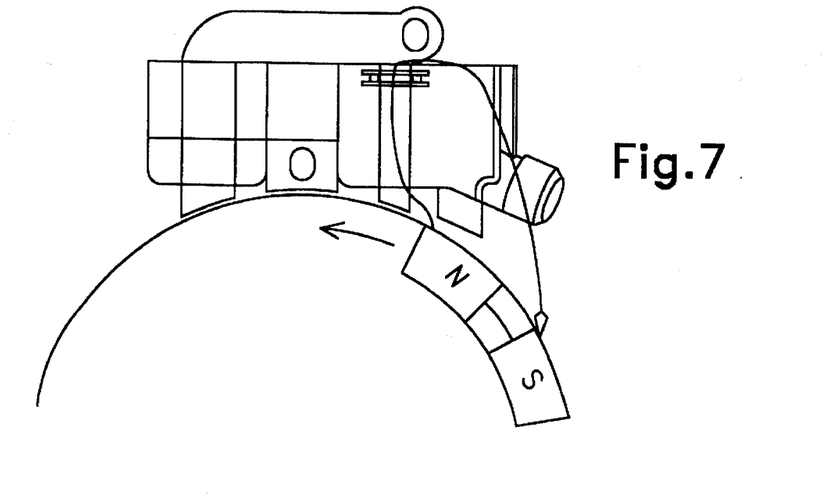
FIGS. 7–9 show the ignition system of FIG. 1 wherein the triggering coil has been wound about a single leg according to prior art technique and with the flywheel in the same positions as shown in FIGS. 4–6.
Figure 8:
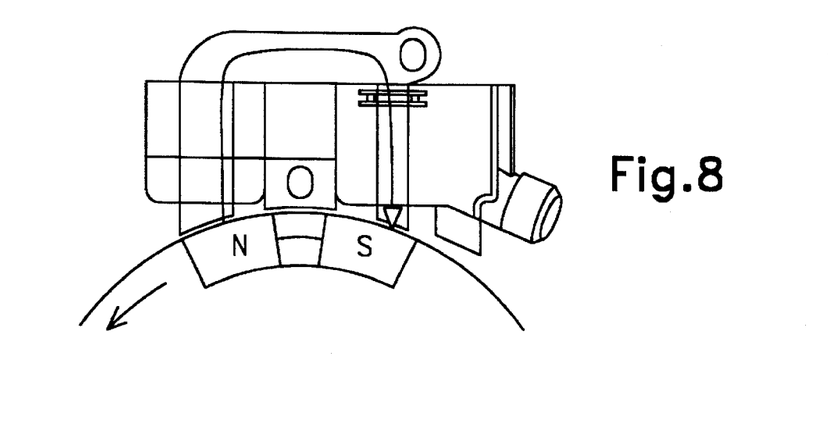
Figure 9:
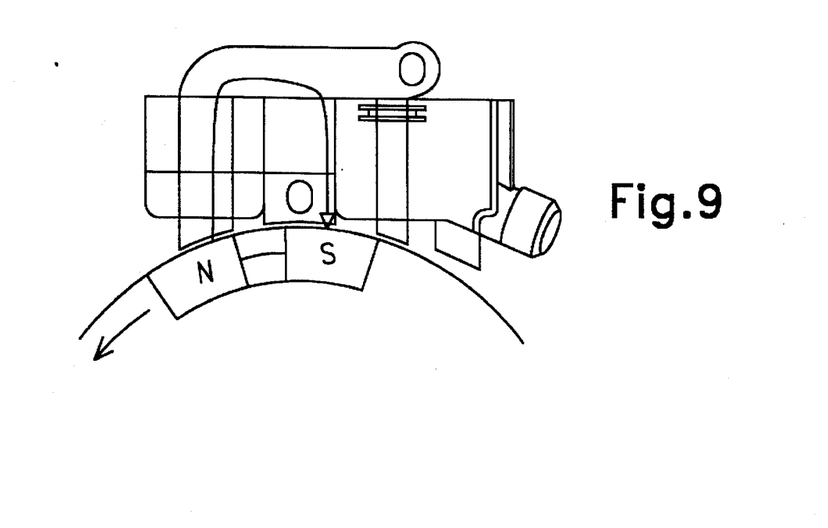

In FIGS. 7–9 the same ignition system is shown as in FIGS. 4–6, however modified such that now the triggering winding encloses only the leg 11. As appears from flow arrows in these drawings, in this case flux passes through the triggering winding at the positions of the flywheel indicated in FIGS. 7 and 8 whereas no flux passes in the position of the flywheel shown in FIG. 9. Accordingly, in the latter case flux passes through the triggering winding during a shorter portion of a complete revolution of the flywheel causing the possibilities of triggering and hence the possible ignition advance to be considerably reduced as compared to the case shown in FIGS. 4–6 where the triggering winding is wound about both legs 11 and 12.

Figure 10A:
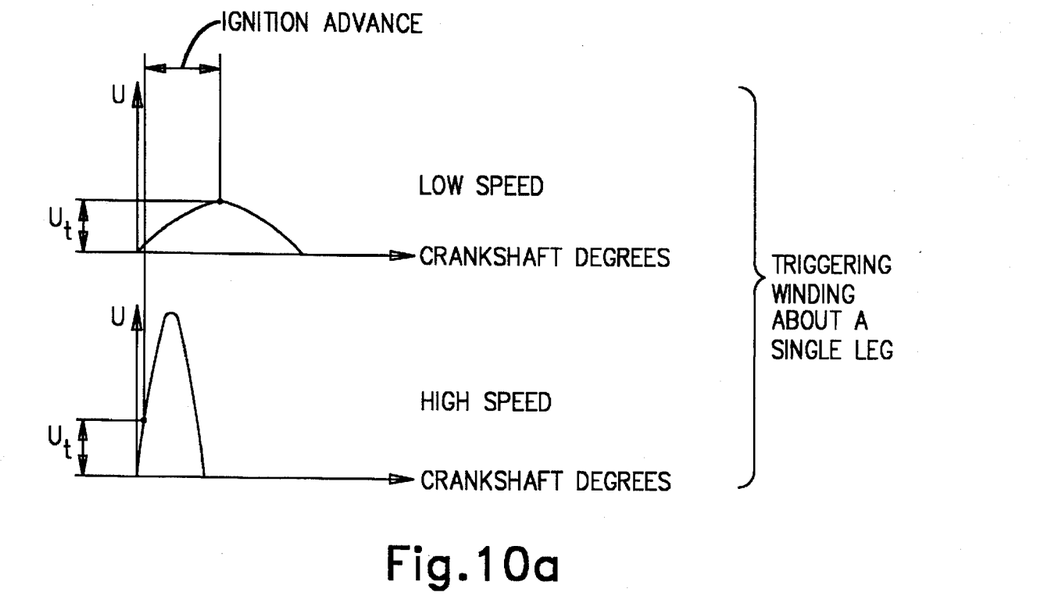
FIG. 10a shows, in principle, the variation of the ignition advance with speed in the embodiment with the single leg supporting the triggering winding according to the prior art technique.
Figure 10B:
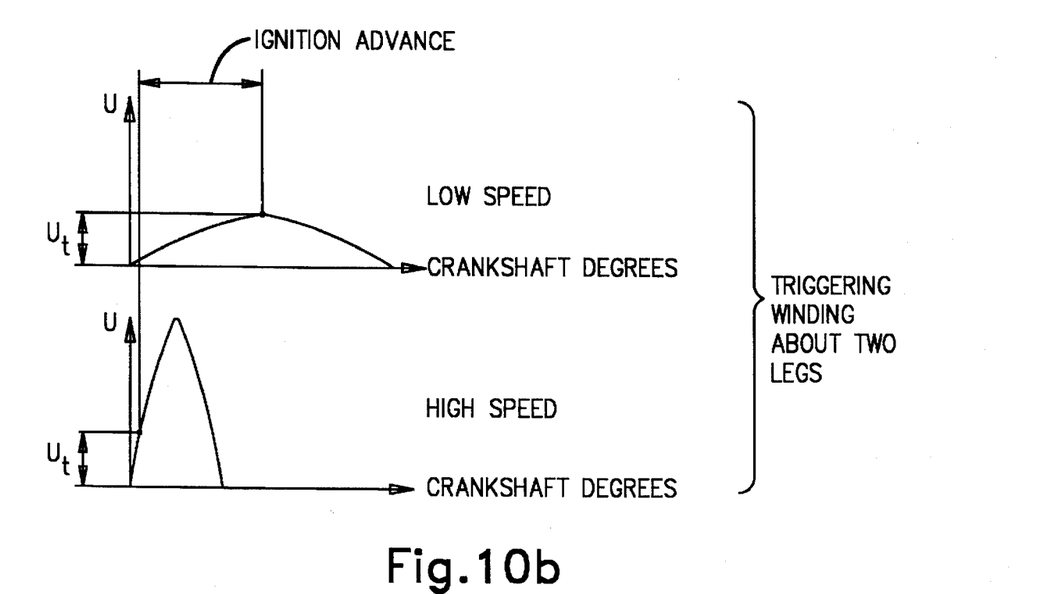
FIG. 10b shows, in principle, the variation of the ignition advance with speed in the embodiment with two supporting legs supporting the triggering winding according to the present invention.

In FIGS. 10a and 10b there is shown a corresponding pricipal diagram of the voltage in the triggering winding as a function of the turning angle of the crankshaft (the number of crankshaft degrees). FIG. 10a shows the case where the triggering winding is wound about a single leg of the iron core. At low speed the voltage curve becomes extended and has a moderate amplitude. However, at high speed the voltage increases considerably quicker and will also reach a higher amplitude.

Turning now to the case where the triggering winding is wound about two legs of the iron core the curves shown in FIG. 10b will be obtained. In this case, at low speed a triggering voltage curve will be obtained which extends over a considerably wider angular area. As a result, with this triggering winding design the flywheel can be so mounted with respect to the iron core that a large ignition advance is obtained at high engine speeds without the ignition advance becoming inadmissably high at idle speed and start, for example involving the risk of backstroke to appear at start.

The continued description will take place in connection with an electric circuit diagram for an ignition system according to a first embodiment of the invention, shown in FIG. 11. The main components of the system comprise the windings on the iron core referred to above, the charging winding 21 and the triggering winding 22, a charging capacitor 26, the ignition coil 17 with the primary 18 and the secondary 19, the spark plug 20 connected to the secondary 19, and an electronic switch in the shape of a thyristor 27. Via a conductor 28 and a diode 29 the charging winding 21 is connected to one terminal of the capacitor 26 while the other terminal of the capacitor, via the primary 18 of the ignition coil, is connected to a common connecting point represented by a conductor 30 having the reference potential zero or ground. In this embodiment the primary is connected in parallel with a diode 31 having its direction of conduction towards the conductor 30.

In the usual way the thyristor has its anode connected to the charging capacitor 26 and its cathode connected to the common reference point, i.a. the conductor 30. The thyristor has a trigger circuit 32 mainly constituted by the triggering winding 22 and the collector-emitter path of a transistor 33. Accordingly, the collector of the transistor is connected to the triggering winding 22, being connected in parallel to a resistor 34, whereas the emitter of the transistor is connected to the control electrode of the thyristor. Further, said emitter is connected to the conductor 30 via a resistor 35. Finally, via a resistor 36, the base of the transistor is connected to the junction between the diode 29, the charging capacitor 26 and the anode of the thyristor 27.

Figures 13, 14:
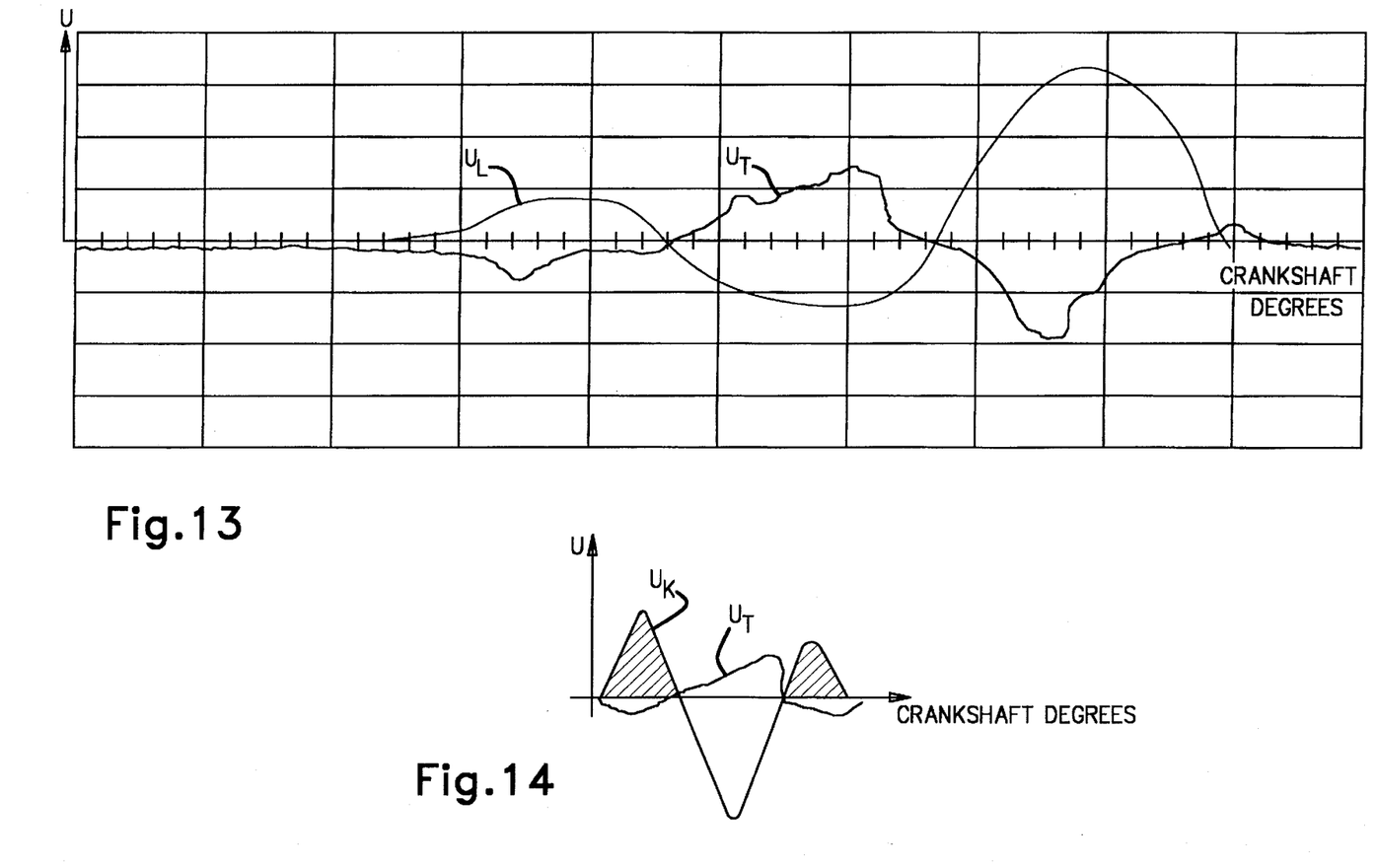

The ignition system according to the embodiment of FIG. 11 operates in the following way. Reference is also made to FIG. 13 showing the time curve forms for different voltages appearing in the ignition system. When the flywheel 14 with its magnet 15 passes the iron core 10 voltages are generated in the charging winding 21 and in the triggering winding 22, respectively, having the time curve forms shown in FIG. 13. When the voltage $U_L$ in the charging winding has a positive polarity charging current flows via the conductor 28 and the diode 29 to the capacitor 26 causing the latter to be charged. In FIG. 13 one can see that during a full revolution for the flywheel 14 the charging voltage $U_L$ has two periods in which charging current flows of which the latter of the two periods gives the most important contribution of charge to the capacitor. During operation of the engine, normally, discharge of the capacitor 26 takes place between the charging periods mentioned so that after the first turn, at start, the capcitor during the second period has already been charged to such a high voltage that any additional charge is not being supplied during the following first period with positive charging voltage. In the continued discussion it is assumed that the capacitor has been charged and that the flywheel 14 is at the beginning of a new passage of the iron core 10. Initially, the voltage $U_T$ in the triggering winding 22 has a negative lapse but then rises, ideally seen, linearly towards a peak value after which it falls to zero and passes on to another negative lapse. In the diagram one can see that the voltages in the charging winding, $U_L$, and in the triggering winding, $U_T$, respectively, appear in anti-phase.

For the triggering of the thyristor the rising part of the triggering voltage is of interest. When the voltage has been rising to a certain level it causes current to flow through the transistor 33 and the resistor 35 resulting in the thyristor being ignited. As a result the capacitor 26 is discharged via the thyristor and the primary 18. In the usual way this causes a high voltage to be generated in the secondary 19 and this high voltage causes a spark in the spark plug 20.

As seen in the diagram of FIG. 13 the useful part of the lapse of the triggering voltage extends over a wide area, in reality over more than 20 crankshaft degrees. According to the invention, this is achieved by the triggering winding being wound about the two legs 11 and 12 of the iron core 10. The diagram illustrates the conditions at idle speed and at the maximum speed, about 14,000 rpm, the triggering voltage curve is of course compressed and the voltage reaches a considerably higher peak value due to the steep flux derivative at these high engine speeds.

Figure 12:
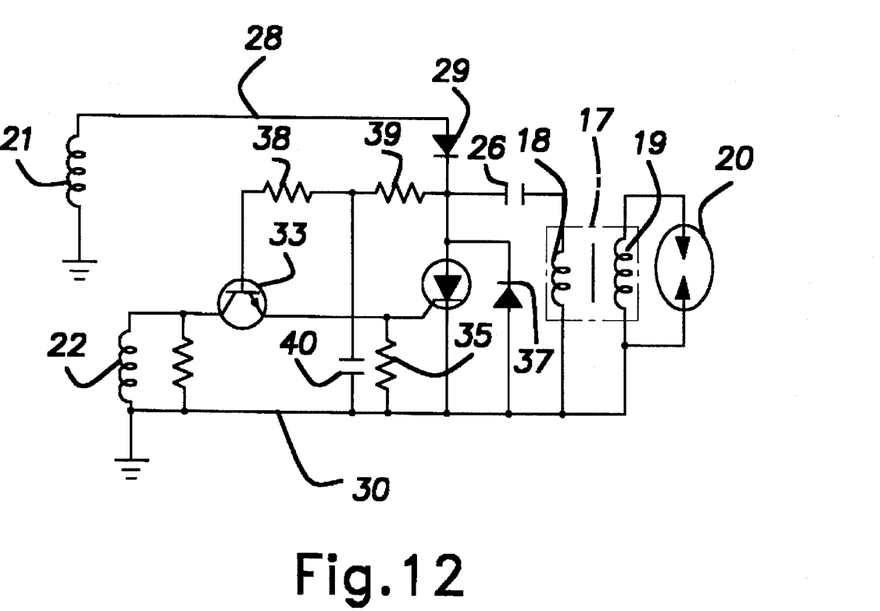
FIG. 12 shows an electric circuit diagram for the ignition system in a second embodiment of the invention.

In the embodiment shown in FIG. 11 the discharge through the primary 18 of the ignition coil takes place in one direction only and a so-called DC-spark appears. In FIG. 12 there is shown an alternative embodiment of the ignition system in which an AC-spark is obtained by permitting, during the discharge of the capacitor 26, the direction of flow of the current to change a number of times in the primary 18. In this embodiment, in relation to the embodiment shown in FIG. 11, the diode 31 has been omitted and instead a diode 37 connected anti-parallel across the thyristor 27. Moreover, the resistor 36 has been replaced by two resistors 38, 39 connected in series, the junction between the two resistors being connected to the conductor 30 via a capacitor 40. In this embodiment, when the discharge of the capacitor has been initiated by the thyristor being ignited, initially current flows through the primary in a first direction whereafter the conditions in the primary become such that the voltage induced in the winding strives to drive current in the opposite direction. The thyristor 27 now switches off and the current can flow in the opposite direction via the diode 37. When the voltage again increases on the anode of the thyristor, said thyristor starts to conduct again and the current can flow through the primary in the first-mentioned direction. These oscillations cause a burst of sparks of alternating polarity in the spark plug and these sparks are therefore referred to as AC-sparks.

In the embodiment shown in FIG. 12, due to the oscillations during the discharge of the capacitor 26 said capacitor will not be completely discharged but a rest voltage will remain of about 20 volts. In order to make use also of part of the stored energy that corresponds to the rest voltage provision has been made for the voltage across the resistor 35 on the control electrode of the thyristor to decline with a certain delay. This delay is approximately 200 μs. The delay is determined by the values of the capacitor 40 and the resistor 38 and suitable values could be 33 kohms for the resistor and 15 nF for the capacitor. By this delay the capacitor 26 will have time to discharge completely so that also the rest voltage will be of use in the ignition spark.

The trigger circuit must be dimensioned also with regard to another phenomenon. In the thyristor 27, between the anode and the control electrode there is a parasitic capacitance $C_p$ which at high engine speeds may conduct a current which is not negligible through the resistor 35. If in this case the transistor 33 should begin to conduct, due to an increasing voltage on its base, and as a result a possible positive voltage be transferred to the emitter side of the transistor driving additional current through the resistor 35 the thyristor 27 might turn on during a period of the capacitor 26 being charged. If in this period the thyristor should be conducting the result would be that the capacitor 26 will not receive charge and ignition sparks would appear at the wrong moment in the engine. In order to avoid the appearance of this phenomenon the values of the resistors 38 and 39 have been chosen such that the voltage on the capacitor 26 must rise to ca 100 volts before the transistor starts conducting. As can be seen from the diagram in FIG. 13, at this moment the triggering voltage is negative and cannot cause triggering of the thyristor.

Ignition systems using energy storage in a capacitor has a burning time which is shorter than in systems where the energy is stored in a coil. In case of large cylinder volumes this may cause an uncertain ignition. In this connection the arrangement of windings shown in FIG. 1 offers obvious advantages. As shown in FIG. 1 the ignition coil is mounted on the leg 11 while the triggering winding is wound about the legs 11 and 12. In this way, at high speeds a signal timing will be obtained which means that at high speeds the ignition system operates as a combined capacitive and inductive system. At speeds exceeding about 6,000 rpm the ignition advance has increased to such extent that the discharge of the capacitor 26 takes place simultaneously with a voltage being induced in the windings 18, 19 of the ignition coil. This causes a considerable increase of the burning time at high speeds and accordingly a safer ignition of the air-fuel mixture.

In another embodiment of the invention there is a desire of providing a power supply coil for powering of associated electronic equipment. To this end the ignition coil 17 has been mounted separately outside of the iron core, for example supported by the plastic cup 25 in an area 24 situated to the right of the iron core, see FIG. 1. Instead, on the leg 11 a power supply coil (not shown) has been provided and voltage from this coil can be obtained via a diode and a smoothing capacitor in a way commonly used and not described in further detail. However, one condition is that power must not be drawn in periods when the triggering voltage is intended to trigger the discharge of the capacitor 26, i.e., in the area in FIG. 13 where the triggering voltage increases linearly and has a positive polarity. This has been illustrated in FIG. 14 which shows the voltage $U_K$ in the power supply coil and the triggering voltage $U_T$ put together in the same diagram. As shown in the diagram power can be taken from the power supply coil during the dashed periods. Due to the fact that the direction of winding of the power supply coil is such that the voltages $U_K$ and $U_T$ appear in anti-phase the voltage $U_K$ in the power supply coil will be negative in the area where the triggering voltage $U_T$ is positive. As current is taken from the power supply coil via a diode it is possible, by choosing a suitable direction of current flow for the diode, to cause a power supply to take place only when the voltage $U_K$ of the power supply coil is positive, i.a. during the dashed periods in FIG. 14.

We claim:

1. Ignition system for an internal combustion engine, comprising a magnetically conducting core (10) having three legs (11,12,13) and supporting a charging winding (21) and a triggering winding (22), a flywheel (14) having at least one magnetic field generating member (15) and adapted to cooperate with the magnetically conducting core (10) to cause, when passing, voltages to be induced in the windings (21,22), and an electronic switch means (27) adapted to trigger, in response to a trigger pulse generated by the triggering winding (22), the discharge of a first capacitor (26), which has been charged by a voltage generated in the charging winding (21), via the primary (18) of an ignition coil (17) the secondary (19) of which comprises a spark plug (20), wherein the triggering winding (22) is wound about a first two (11,12) of the three legs, as seen in a normal direction of rotation of the flywheel, on the magnetically conducting core (10) whereas a third of said three legs (13) supports the charging winding (21).

2. Ignition system according to claim 1, wherein the electronic switch means (27) is a thyristor (27), a trigger circuit (32) of said thyristor comprising a transistor (33) which is connected to the first capacitor (26) such that, after discharge has taken place, the transistor (33) prevents trigger pulses from acting on the thyristor (27) until a new charging period has been initiated and the charging voltage on the first capacitor (26) has reached a predetermined level.

3. Ignition system according to claim 2, wherein an emitter of the transistor (33) is connected to a control electrode of the thyristor (27), and a base of the transistor (33), via a resistor (36), is connected to a junction between a terminal of the first capacitor (26) connected to the charging winding (21) and an anode of the thyristor (27), a collector of the transistor (33) being connected to the triggering winding (22), and the collector and the emitter, via a respective resistor (34;35), are connected to a common reference point (30) to which is also connected opposite ends of the windings (21,22) and a cathode of the thyristor (27).

4. Ignition system according to claim 3, wherein the resistor (36) connected between the base of the transistor (33) and the first capacitor (26) has a value selected so that the voltage ($U_T$) induced in the triggering winding (22) cannot drive current through the transistor (33) until the first capacitor (26) has been charged to a predetermined value sufficient for avoiding, at high engine speeds, triggering of the thyristor (27) by current flowing therethrough and generated by the voltage ($U_L$) in the charging winding (21).

5. Ignition system according to claim 3 or claim 4, wherein values of the resistors (34;35) connected to the emitter and the collector, respectively, of the transistor (33) are selected such that the area of growth of the triggering voltage ($U_T$) extends over at least 20 crankshaft degrees for the associated internal combustion engine.

6. Ignition system according to claim 5, wherein the primary (18) of the ignition coil (17) is connected between a terminal of the first capacitor (26) opposite to the one facing the charging winding (21) and the common reference point (30) in parallel with a diode (31), said diode having its direction of current flow away from the first capacitor (26).

7. Ignition system according to claim 5, wherein a diode (37) is connected in anti-parallel across the thyristor (27), the base of the transistor (33) is connected to the first capacitor (26) via two resistors (38,39), the junction between the two resistors (38,39) is connected to the common reference point (30) via a second capacitor (40), and the primary (18) of the ignition coil (17) is connected between a terminal of the first capacitor (26) opposite the one facing the charging winding (21) and the common reference point (30).

8. Ignition system according to claim 7, wherein the second capacitor (40) and the resistor (38) connected to the base of the transistor (33) have values such that the transistor (33) remains in a non-conducting state for a period of time after discharge of the first capacitor (26) has taken place, said period of time having a magnitude permitting the first capacitor (26) to become almost completely discharged.

9. Ignition system according to claim 1, wherein the primary and the secondary (18,19) of the ignition coil are provided on the first leg (11), as seen in the normal direction of movement of the flywheel (14).

* * * * *